United States Patent Office 3,513,932
Patented May 26, 1970

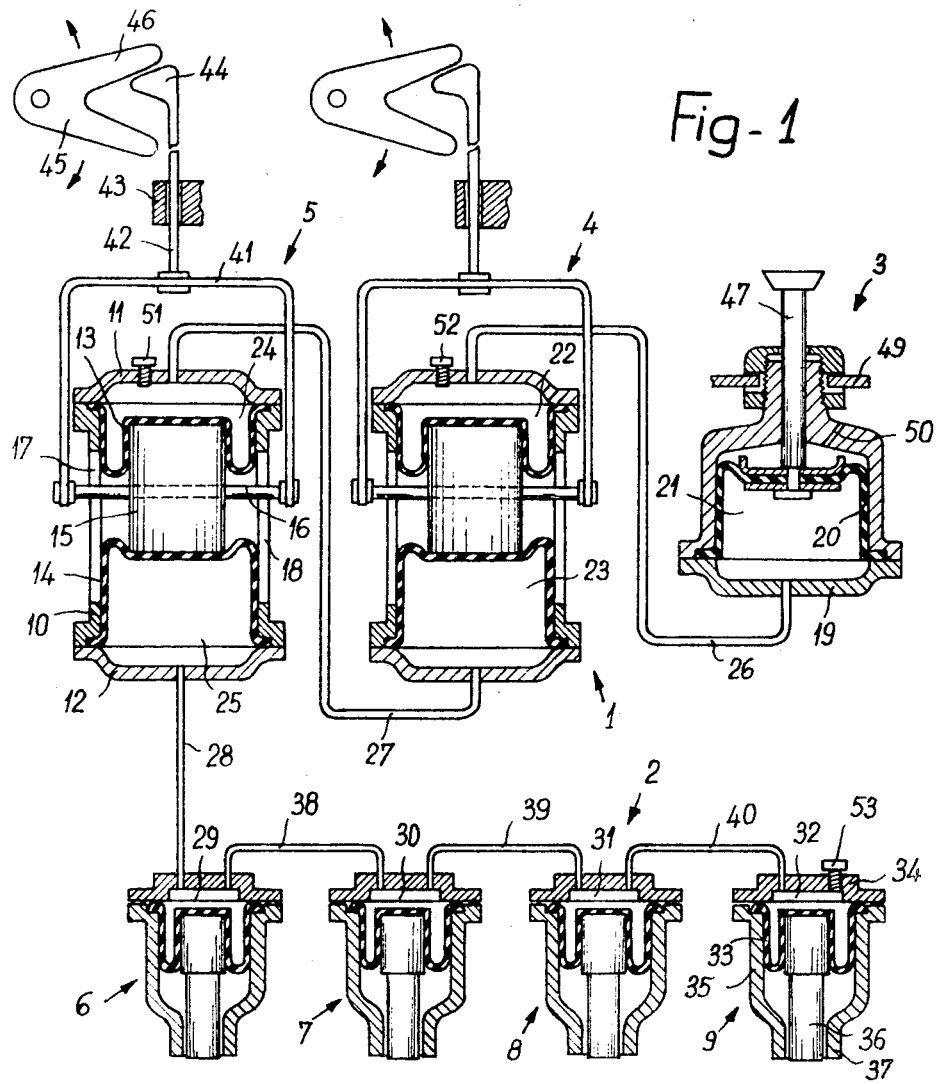
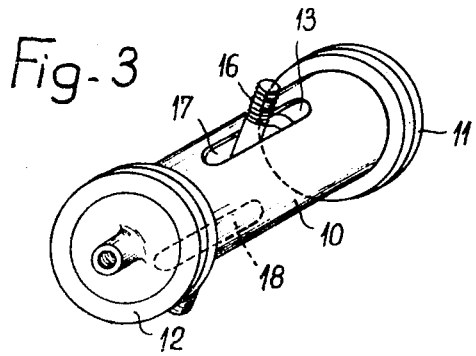
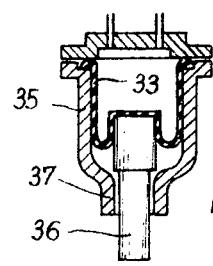

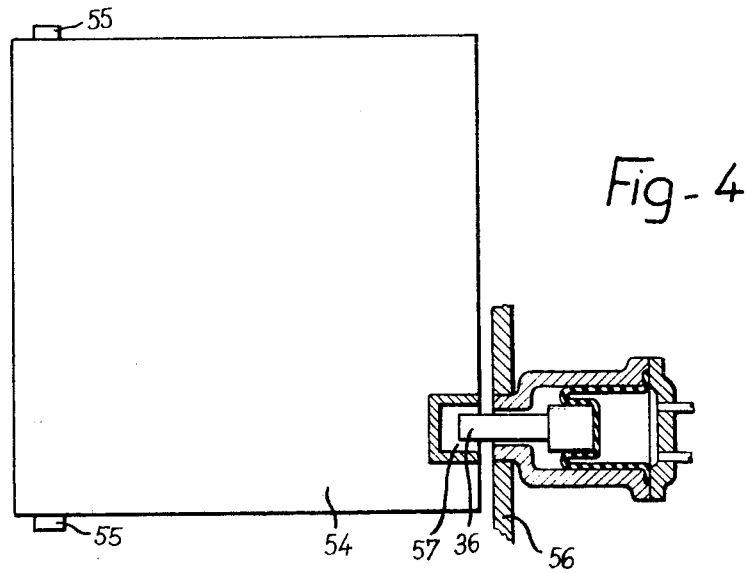
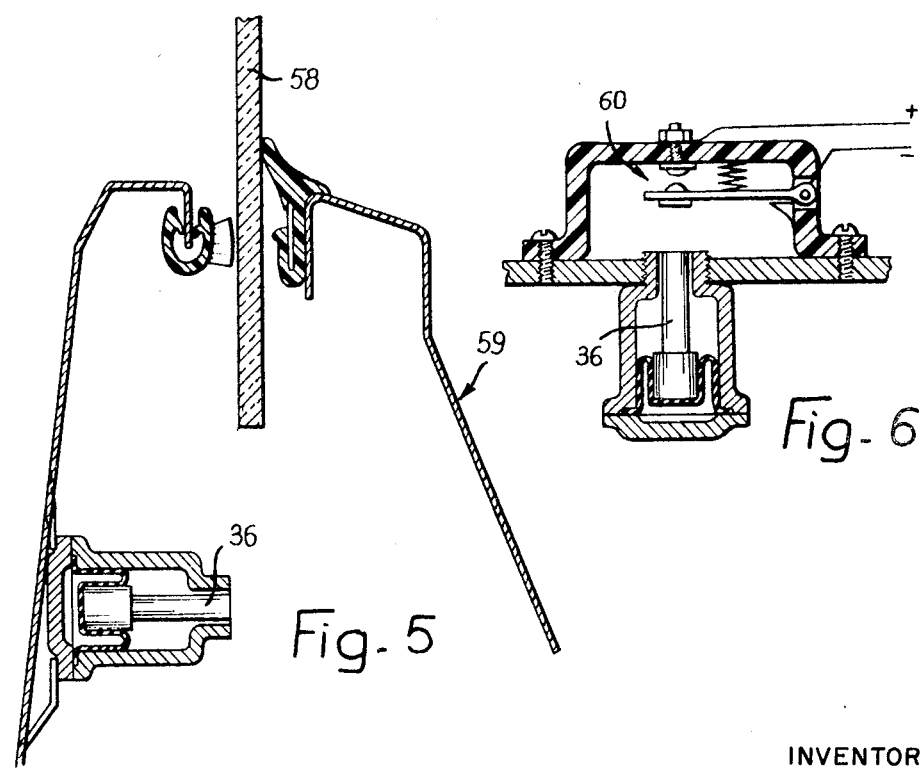

3,513,932
HYDRAULIC DEVICES FOR SIMULTANEOUSLY LOCKING THE OPENING PANELS OF A VEHICLE
Pierre Ventre, Billancourt, France, assignor to Regie Nationale des Usines Renault, Billancourt, Hauts-de-Seine, France, and Societe Industrielle et Commerciale des Automobiles Peugeot, Paris, France
Filed Oct. 17, 1967, Ser. No. 675,980
Claims priority, application France, Nov. 17, 1966, 83,964
Int. Cl. B60r 25/00
U.S. Cl. 180—112                                                                 10 Claims

ABSTRACT OF THE DISCLOSURE

Device for simultaneously locking multiple opening panels of a vehicle, wherein locking actuators are responsive to a hydraulic volumetric transmission comprising a number of control members which is independent of the number of actuators in the device.

---

This invention relates to a device for simultaneously locking a plurality of opening panels of a vehicle, e.g. the doors and windows of an automotive vehicle.

Devices are already known which are capable of locking by a single actuation several doors of an automotive vehicle. As a rule, these devices are operated by using the pressure available in a control fluid circuit and the extensibility of resilient membranes or sheaths. However, these devices are characterised by a number of inconveniences of which the essential ones may be summarized as follows:

(1) If one of the doors is not properly closed and therefore the female recesses or keepers do not register with the male locking members, the user may still operate the door closing means without becoming aware that one of the locking elements did not expand properly, as the pressure is then distributed among the other elements by elastic distortion;

(2) In the case of a multiple control system with resilient right-hand and left-hand, external and internal, distortion of the members provided for locking the doors of a vehicle, the faulty operation may be further aggravated since the various control members have the same capacity so that the pressure may be transferred from some members to other members so that the action exerted on the locking members proper is reduced accordingly;

(3) Finally, these known devices are ill suited for a multiple control system wherein the doors are locked and unlocked simultaneously on both sides of the vehicle by operating a single control member; more particularly, with these devices it is not possible to lock all the doors of the vehicle by operating the control member located on the near side of the vehicle and to release the locks by operating the control member located on the off side, or vice-versa.

Besides, door locking systems are already known wherein the locking member proper, such as a bolt, latch or the like consists of or is responsive to a rod to which an axial movement of translation can be imparted.

Starting from the mechanism of which the principle has been broadly set forth hereinabove, that is, a device for simultaneously locking the multiple opening panels of vehicles equipped with locks adapted to be closed and opened by the axial movement of translation of a rod, the present invention is characterised essentially by the following features:

The rod translation is controlled by a number of members independent of the number of rods.

The device comprises a control circuit and a power circuit filled with incompressible liquid. The control circuit consists of a series of successive, variable-volume chambers and comprises at one end a first chamber and at the other end a last chamber. The series consists of said first chamber closed by a fluid-tight but movable wall permitting the volume variations in said first chamber, and of at least one group of two chambers each which are isolated from each other and separated by a fluid-tight movable volume-variation wall. These chambers communicate by pairs with each other and the last chamber of the group is connected to the aforesaid power circuit. This power circuit consists in turn of hydraulic actuators having each a single working chamber, the movable elements of these actuators consisting of said rods; the working chambers of these actuators are in fluid communication with one another and also with said last chamber of the control circuit.

The movable wall of said groups are each connected to a control element with which they constitute a control member, in such a manner that this element permits of producing a volume variation which is transmitted to all the chambers of the control circuit. The maximum permissible volume variation is at least equal to the total maximum useful volume of said working chambers.

Under these conditions, in the present invention the inconveniences set forth in paragraphs (1) and (2) hereinabove are avoided by replacing the devices operating under pressure by volumetric-displacement devices without any kind of extensibility, whereby the locking action is definitely prevented when the movement of the locking members proper is prevented by any reason.

The inconvenience set forth in paragraph (3) hereinabove is also eliminated by providing a multiple control device capable of locking and unlocking simultaneously all the panels of a vehicle from any desired control position.

Other features and advantages of this invention will appear as the following description proceeds with reference to the accompanying drawing illustrating diagrammatically by way of example a typical form of embodiment of the hydraulic locking device constituting the subject-matter of this invention. In the drawing:

FIG. 1 is a diagrammatic sectional view showing the complete device in the unlocking position;

FIG. 2 shows in diagrammatic sectional view an actuator in its locking position, FIG. 3 is a perspective view showing a group of chambers of the control circuit;

FIG. 4 is a diagrammatic sectional view showing the direct use of an actuator for locking a vehicle door;

FIG. 5 is a diagrammatic sectional view showing the use of an actuator in relationship with a window pane, and FIG. 6 is a diagrammatic sectional view showing the use of an actuator for controlling a switch.

The device illustrated in the drawing by way of example comprises a control circuit 1 and a power circuit 2. The control circuit 1 comprises a plurality of control members, i.e. three in the example illustrated, these members being designated by the reference numerals 3, 4 and 5, each member corresponding to a point or position of the vehicle from which it is desired to control the locking action.

The power circuit 2 comprise as many actuators, for example four (designated by the reference numerals 6, 7, 8, and 9) in the case illustrated, as there are points where it is desired to produce the locking action.

Each control member except the first of the series, shown at 3, consists of a cylindrical body 10 having its bottoms closed in a fluid-tight manner by covers 11 and 12. A flexible bellows-type membrane 13 and 14 is secured by its outer peripheral edge between each end cover 11 and 12 and the body 10, the means for securing the covers and the body being omitted to simplify the drawing. The pair of bellows-membranes associated with a same body 10 are mounted in opposition and a piston 15 is disposed between and secured to the central portions of these membranes, each piston 15 has fitted thereacross a bar 16 forming a pair of opposite studs projecting from the outer surface of the body 10 through a pair of slots 17 and 18 formed therein.

The first control member 3 comprises a single bottom cover 19 and a single bellow-membrane 20.

Each cover and each membrane form therebetween a fluid-tight chamber of which the volume varies as a function of the membrane movements.

The control circuit 1 will thus consist of a first chamber 21 and of one or a plurality of groups or pairs of chambers provided in each control member. Thus, control member 4 encloses two chambers 22 and 23 separated in a fluid-tight manner by the bellows-like membranes and the control member 5 comprises chambers 24 and 25 separated by membranes 13 and 14.

The first chamber 21 communicates via a pipe line 26 with chamber 22, chamber 23 is connected via a pipe line 27 to chamber 24, and the last chamber 25 of the control circuit is connected via a pipe line 28 with the power circuit (consisting of hydraulic actuators 6, 7, 8 and 9 having a single working chamber 29, 30, 31 and 32).

Each hydraulic actuator comprises a flexible bellows-like membrane 33 having its outer edge clamped by means not shown between a bottom cover 34 and a cylinder 35. The central position or bottom of the membrane 33 is secured to one end of a rod 36 slidably mounted in a narrower portion 37 of the cylinder. The working chambers 29 to 32 are in fluid connection with one another through pipe lines 38, 39 and 40 and with the aforesaid pipe line 28.

All the pipe lines open into the relevant chambers through fluid-tight passages, such as unions or like connecting means provided in the bottoms and covers.

The space constituted by said chambers and fluid-tight passages is filled with a suitable incompressible fluid.

The volume of the working chambers 29 to 32 can be varied by means of suitable control elements provided to this end.

Adapted to be moved by means of lock keys from the exterior of the vehicle, the pistons of control members 4 and 5 are rigidly connected through said bars 16 with yokes 41 having their side arms parallel to the axis of the corresponding body 10. The central or intermediate member of each yoke is connected to one end of a rod 42 sliding in a support 43, the opposite end of this rod 42 carrying a nose 44 projecting inbetween the two arms 45 and 46 of a pivoting lever rigid with the barrel of a safety lock (not shown). The lever is shown in its neutral position in which it is normally urged by resilient or other suitable means to prevent the circuits from becoming jammed.

The bottom or central portion of membrane 20 bounding the first chamber 21 is clamped between two washers or discs and secured to one end of a push-and-pull knob 47 guided in a protection cover 48 secured in turn to the instrument panel 49 of the automotive vehicle. An air venting orifice 50 is formed in said cover 48 to permit the free distortion of membrane 20.

As will be readily understood, pulling or pushing the knob 47, or turning a key in one of the safety locks, will cause one of the two-armed levers 45–46 to pivot in one or the other direction to alter the shape of the bellows membranes 13, 14 and 20 and thus cause the volume of all the chambers of the control circuit to vary. This is made possible on the one hand by the fact that the membrane separating the two chambers 24 and 25 of each group 4 and 5 are assembled by means of the piston 15 and thus act as a movable partition, and on the other hand by the fact that the first chamber 21 communicates with one of the two chambers of the first next group 4, and that the groups communicate each other each time through only one of their chambers.

Of course, the dimensions of the chambers and membranes are so calculated that the volume variation of these chambers is always the same, irrespective of the specific control element actuated by the user.

Besides, if the term "useful volume of a working chamber" of an actuator means the difference between the volume of this actuator with its rod or piston retracted as shown in FIG. 1, and the volume of the same actuator with its rod or piston in its outermost position as shown in FIG. 2, the total useful volume of all the set of actuators must not exceed the variation in the maximum volume attainable by the chambers of the control circuit.

Of course, means must be provided in the device of this invention for draining off or purging the gas possibly contained in the system, in order to permit a proper operation thereof. To this end, venting or purging orifices closed by screw plugs 51, 52 and 53 are provided at the upper points of the system.

Regarding the actuators, their retractable rods may be used for locking in its closed position a movable lock member such as a bolt, latch or push-button. In this case, it is only necessary to provide on this bolt, latch or push-button, or in a part rigid therewith, a recess engageable by the rod of the actuator. The actuator may also be used for locking a panel 54 pivotally mounted in its frame 56 directly around axis 55, the actuator being mounted in one of these two component elements of its body or structure, an orifice being formed in the other element and adapted to be engaged by the actuator rod (FIG. 4). It must be noted that generally the pulling of the knob 47 (FIG. 1) establishes a depression in all chambers 21 to 25 and 29 to 32, causing the rods 36 to move inwardly. Obviously, it may be possible to reinforce the return force by using return compression springs mounted, for example, in the orifices 57 between the ground of said orifices and the end of said rods 36, or in the casing of the actuators (FIG. 4).

The device described hereinabove by way of example operates as follows:

From the lock release position shown in FIG. 1 and assuming that it is desired to lock the panels from inside the vehicle, it is only necessary to depress the knob 47 so that the fluid in chamber 21 is forced into the top chamber 22 of the next control member 4. The fluid volume displacement thus produced is transmitted through the other control members to the last control chamber 25 of which the liquid will fill the working chambers 29 to 32 of actuators 6 to 9, the bellows-membrane forcing the rods 36 outwards. These rods thus emerge from the relevant actuators to either lock the panels directly in their frame or to operate the locks mounted in these panels as already explained hereinabove.

The unlocking or release operation is obtained by pulling the knob 47, whereby the reverse sequence of operations takes place.

To operate the system from the exterior of the vehicle it is only necessary to use a lock key for pivoting one of the two-armed levers 45, 46 in one or the other direction, the volume variation being thus transmitted to all the chambers of the control circuit 1 and the rods 36 are caused to slide in one or the other direction.

In order to make the vehicle definitely tamper-proof, this invention permits of mounting an actuator in the vicinity of at least one winding window or of an element movable therewith so that the opening window 58 (FIG. 5) will prevent the actuator rod 36 from emerging from the actuator. As the reduction in the volume of the last chamber 25 which is normally contemplated for filling completely all the useful volumes or spaces of the working chambers cannot take place, the incomplete rotation of the key will show that the panels or doors 59 have not been locked (FIG. 5).

Another solution consists to the same end in mounting in close vicinity of the winding window a two-chamber cylinder in lieu of a hydraulic actuator of the type set forth. In this case it is the rod 42, without the nose or like projection 44, which is so disposed on the path of the window that when the latter is lowered it prevents the piston 15 from moving in the direction to fill the actuators, that is, in the locking direction. Thus, the rotational movement of the key is not only incomplete as in the preceding case but also positively prevented.

Finally, if the vehicle is equipped with electric window regulators an actuator may also be provided which is adapted to close the switch 60 for energizing the electric motor when the doors are being locked, so that all the windows would be raised automatically (FIG. 6).

Of course, other embodiments of the present invention than those described and suggested hereinabove are possible within the scope of the atached claims, as will readily occur to anybody conversant with the art.

I claim:

1. A hydraulic device for simultaneously locking a plurality of panels of a vehicle equipped with locking means each adapted to be closed and opened as a consequence of the axial movement of translation of a rod, wherein said movement of translation is controlled by a number of control members which is independent of the number of rods in the device, said device comprising a control circuit and a power circuit both filled with an incompressible fluid, said control circuit consisting of a series of successive variable-volume chambers which comprises at one end a first chamber and at the other end a second chamber and consists of said first chamber closed by a movable fluid-tight volume-variation wall and of at least one group of two chambers isolated from each other and separated by a movable fluid-tight volume-variation wall, said chambers communicating with one another by pairs, the last chamber of said group being connected to said power circuit, said power circuit consisting of a plurality of hydraulic actuators having a single working chamber and of which the movable elements consist of said rods, the working chambers of said actuators communicating with one another and with said last chamber, the movable wall of each of said groups being connected to an operating element in such a manner that it constitutes a control member, said operating element permitting a volume variation transmitted to all the chambers of said control circuit, the maximum permissible volume variation being at least equal to the total maximum useful volume of said working chambers of said actuators.

2. A device as set forth in claim 1, wherein said movable wall of said first chamber is also connected to an operating element to constitute one of said control members.

3. A device as set forth in claim 1, wherein said movable walls consist of pistons.

4. A device as set forth in claim 1, wherein the movable wall of said first chamber consists of a bellows membrane and the other movable walls consist each of a pair of oppositely mounted bellows membranes both secured to an intermediate piston operatively connected to said operating element by means of a pair of studs projecting radially from said piston and through a pair of slots formed in a cylindrical body containing the two chambers of a same group.

5. A device as set forth in claim 2, wherein said operating element associated with one group is adapted to be actuated by means of a lock key, the operating element of said first chamber comprising a push-and-pull knob slidably mounted in the instrument panel of an automotive vehicle and connected to the movable wall of said first chamber.

6. A device as set forth in claim 1, wherein the working of each actuator is closed by a bellows membrane of which the central portion is connected to one end of said rod.

7. A device as set forth in claim 6, wherein the other end of said rod acts as a bolt adapted to engage a keeper forming recess, said bolt and said recess being formed the one on said panel and the other in the panel frame.

8. A device as set forth in claim 1, wherein an actuator rod is so arranged in the vicinity of a window pane or of a member movable bodily therewith, that said locking action is prevented as long as the window remains open.

9. A device as set forth in claim 1, wherein a member rigid with a movable panel is so disposed in the path of a window pane or of a member movable bodily therewith that said locking action is prevented as long as the window remains open.

10. A device as set forth in claim 1, mounted on a vehicle equipped with electric window regulators, wherein an electric switch controlling the electric motor of each regulator is so arranged in the path of the movable element of the relevant actuator that it is adapted to control the closing of said switch and therefore the operation of said motor in the direction to close all the windows during the panel locking operation.

References Cited

UNITED STATES PATENTS

| | | | |
|---|---|---|---|
| 2,221,044 | 11/1940 | Dimick | 70—262 X |
| 2,974,742 | 3/1961 | Tyler | 70—264 X |
| 3,110,353 | 11/1963 | Oishei et al. | 70—264 X |
| 3,135,545 | 6/1964 | Abrams | 180—112 |
| 3,168,932 | 2/1965 | Deibel et al. | 70—264 X |

KENNETH H. BETTS, Primary Examiner

U.S. Cl. X.R.

49—280; 70—264